United States Patent
Kikuchi et al.

(10) Patent No.: US 6,852,392 B2
(45) Date of Patent: Feb. 8, 2005

(54) POROUS SHEET, FIBER COMPOSITE SHEET AND PROCESSES FOR THE PRODUCTION THEREOF

(75) Inventors: Masayoshi Kikuchi, Mihara (JP); Nobuo Ohkawa, Mihara (JP)

(73) Assignee: Teijin Limited, Osaka (JP)

( * ) Notice: Subject to any disclaimer, the term of this patent is extended or adjusted under 35 U.S.C. 154(b) by 29 days.

(21) Appl. No.: 10/343,769

(22) PCT Filed: Jun. 7, 2002

(86) PCT No.: PCT/JP02/05685

§ 371 (c)(1),
(2), (4) Date: Feb. 4, 2003

(87) PCT Pub. No.: WO02/101141

PCT Pub. Date: Dec. 19, 2002

(65) Prior Publication Data

US 2003/0134101 A1 Jul. 17, 2003

(30) Foreign Application Priority Data

Jun. 12, 2001 (JP) .................................... 2001-176995

(51) Int. Cl.[7] ................................................ B32B 3/00
(52) U.S. Cl. .................. 428/166; 428/137; 428/155; 428/156; 428/166; 428/220; 264/41; 264/45.1; 264/45.6; 264/653
(58) Field of Search ................................ 428/131, 132, 428/137, 155, 156, 166, 172, 178, 188, 213, 220, 42.1; 264/41, 45.1, 45.6, 653

(56) References Cited

U.S. PATENT DOCUMENTS 4,469,744 A * 9/1984 Grot et al. ................... 442/88
6,130,175 A * 10/2000 Rusch et al. ................. 442/77

FOREIGN PATENT DOCUMENTS

| EP | 000617159 | | 9/1994 |
|---|---|---|---|
| EP | 1 164 169 A1 | | 12/2001 |
| EP | 1 270 801 A1 | | 1/2003 |
| EP | 1270801 A1 | * | 2/2003 |
| JP | 01-104634 A | | 4/1989 |
| JP | 03-097976 | | 4/1991 |
| JP | 07-268781 | | 10/1995 |
| JP | 09-158056 A | | 6/1997 |

* cited by examiner

Primary Examiner—Merrick Dixon
(74) Attorney, Agent, or Firm—Sughrue Mion, PLLC

(57) ABSTRACT

A porous sheet is provided suitable for use as a substitute for natural leather for shoes, clothes, and a fiber composite sheet. The porous sheet is formed of an elastic polymer, has a thickness of 10 to 500 $\mu$m, and has 500 to 15,000 fine pores mm$^2$ inside, the fine pores having an average pore diameter of 1 to 20 $\mu$m, and which has a breaking strength of 1 to 15 N/mm$^2$ and a breaking elongation of 100 to 500%. A fiber composite sheet is also provided, wherein the porous sheet is laminated on a substrate made of a fiber aggregate as a main component.

26 Claims, No Drawings

POROUS SHEET, FIBER COMPOSITE SHEET AND PROCESSES FOR THE PRODUCTION THEREOF

DETAILED DESCRIPTION OF THE INVENTION

The present invention relates to a porous sheet suitable for use as a substitute for natural leather, a fiber composite sheet to which it is applied, and processes for the production thereof. More specifically, it relates to a porous sheet whose organic solvent content is small, which is global-environmentally friendly and excellent in feeling and which is suitable for use as a substitute for natural leather for shoes and clothes, a fiber composite sheet to which it is applied, and process for the production thereof.

PRIOR ART

In recent years, a fiber composite sheet formed by laminating a sheet made of an elastic polymer on the surface of a substrate made of a fiber aggregate as a main component is widely used for clothes and in the fields of general materials and sports as a substitute for natural leather owing to characteristic features such as a light weight, easy care and a low price.

It is known that a sheet made of an elastic polymer to be laminated on the substrate surface gives a composite sheet excellent in feeling when the sheet has a number of fine pores. As such a sheet, sheets made by a so-called wet coagulation method are widely used.

The above sheet production method called "wet coagulation method" refers to a method in which a solution of a urethane resin dissolved in an organic solvent containing N,N-dimethylformamide (DMF) as a main component is applied onto a substrate, etc., made of fibers, and the urethane resin is coagulated in water to form a finely porous sheet made of an elastic polymer. The above method gives a finely porous sheet. However, the size of pores increases with an increase in the distance thereof from an interface with water, and the size of the fine pores cannot be uniformly maintained in the entire sheet, so that the sheet obtained by the method has a problem that the strength thereof decreases. Further, there is also another problem that a dense skin layer is formed on a surface that is in contact with water during the coagulation in water, so that the sheet obtained is hard. In the above production method, the wet coagulation takes a long time, and there is a problem that an expensive large specialized system is inevitably required.

As a method of keeping a uniform size of pores, therefore, attempts have been recently made in various ways to improve a dry transfer method in which, conventionally, only a solid layer is formed, instead of the wet coagulation method, for forming a sheet having pores. The dry transfer method refers to a method in which a solution or dispersion of an elastic polymer is applied onto a release paper, etc., and dried to form a sheet made of the elastic polymer, and the thus-obtained sheet is laminated on a substrate surface with an adhesive made of an elastic polymer. The dry transfer method has an advantage that processing can be carried out with a simple system as compared with the wet coagulation method. According to a conventional method, however, a sheet obtained by the above dry transfer method is a solid sheet densely packed with an elastic polymer, and no pores exist, so that the sheet feels hard.

For forming a sheet having pores by a dry transfer method, there are being tested a method (1) in which an elastic polymer solution having a certain viscosity or higher is mechanically foamed and a foamed solution containing foams is coated and dried, and a method (2) in which an elastic polymer solution containing foams-generating substance is coated and the substance is foamed with heat during drying. In sheets obtained by these methods, pore diameters alone are uniformly distributed in the thickness direction. However, pores are formed by means of a gas, so that the pore diameters cannot be controlled, and there is a problem that pores having large sizes are eventually formed. As a result, not only a portion having pores having large diameters decreases in physical properties such as strength, but also thin and fine pores cannot be formed, so that there is a problem that such sheets are poor in surface appearance.

For example, JP-A-9-158056 discloses a method in which a melt of a thermoplastic elastomer containing foams or a foams-generating substance is extruded in the form of a film on the surface of a substrate made of fibers with an extruder, to form a porous sheet. However, the content of foams in the porous sheet is as large as 70 volt, and the pores have a large diameter.

Further, for example, JP-B-6-60260 discloses a method in which a composition containing a thermally coagulable polyurethane emulsion and heat-expandable plastic microballoons is treated in water or water vapor at 40 to 190° C. Due to foaming, however, a sheet obtained comes to have a thickness that is 3 to 5 times the thickness of a sheet that is not treated, and the diameter of pores is also large.

Problems to be Solved by the Invention

The present invention has been made for overcoming the problems of the above prior arts. An object thereof is to provide a porous sheet that is excellent in feeling and suitable for use as a substitute form natural leather for shoes and clothes, and a fiber composite sheet to which the porous sheet is applied.

It is also another object of the present invention to provide a method for producing a porous sheet suitable for use as a substitute for natural leather and a method for producing a fiber composite sheet to which it is applied, which methods suppress the emission of an organic solvent to atmosphere so that they are global-environmentally friendly, and are industrially rational.

Means to Solve the Problems

According to studies made by the present inventors, it has been found that the above objects of the present invention can be achieved by a porous sheet, a process for the production thereof, a fiber composite sheet and a process for the production thereof, which will be described below.

(1) A porous sheet formed of an elastic polymer (1), the sheet having a thickness of 10 to 500 $\mu$m and having 500 to 15,000 pores per mm$^2$ inside, the fine pores having an average pore diameter of 1 to 20 $\mu$m, the porous sheet having a breaking strength of 1 to 15 N/mm$^2$ and a breaking elongation of 100 to 500%.

(2) A process for the production of a porous sheet, which comprises preparing a stable aqueous dispersion (1) containing an elastic polymer (1) and water-repellent particles, pre-heating the aqueous dispersion (1) at a temperature of 60 to 90° C. under a condition where the aqueous dispersion (1) has a water content of 20 to 80 wt %, and then removing water.

(3) A fiber composite sheet comprising a substrate made of a fiber aggregate as a main component and the porous sheet of the above (1) laminated on the surface of the substrate.

(4) A process for the production of a fiber composite sheet which comprises laminating the porous sheet of the above (1) on the surface of a substrate made of a fiber aggregate as a main component to form a laminate, heating the laminate at a temperature of 100 to 150° C. for 3 seconds to 5 minutes and then nip-treating the laminate with a hot roll at 100 to 150° C.

(5) A process for the production of a fiber composite sheet, which comprises laminating a substrate made of a fiber aggregate as a main component on the porous sheet of the above (1) formed on the surface of a release paper to form a laminate, heating the laminate at a temperature of 100 to 150° C. for 3 seconds to 5 minutes, then nip-treating the laminate with a hot roll at 100 to 150° C., aging the laminate at a temperature of 50 to 70° C. for 16 to 48 hours and then peeling the release paper off.

Mode of Practice of the Invention

The porous sheet, the fiber composite sheet and the processes for the production thereof, provided by the present invention, will be explained more in detail hereinafter.

The elastic polymer (1) for use in the porous sheet of the present invention is not specially limited, and examples thereof include elastic polymer resins such as a polyester-based elastomer, polyurethane, NBR, SBR and an acrylic resin. Of these, a polyurethane resin is preferred in view of flexibility, strength, weatherability and abrasion resistance, and further, preferably, these elastic polymer resins are crosslinked. For suppressing the content of an organic solvent, more preferably, the elastic polymer is water-dispersible. The thickness of the porous sheet is 10 to 500 $\mu$m from the viewpoint of a balance between feeling and strength. The sheet preferably has a thickness of 20 to 300 $\mu$m.

The porous sheet of the present invention has 500 to 15,000 fine pores inside per $mm^2$, and the fine pores have an average pore diameter of 1 to 20 $\mu$m. The average pore diameter of the fine pores is more preferably 3 to 15 $\mu$m, and the number of the fine pores per nun is more preferably 3,000 to 12,000. The diameters of the individual fine pores are preferably in the range of from 1 to 30 $\mu$m.

The porous sheet of the present invention has fine pores in the above ranges, so that the porous sheet can attain both of strength and feeling that cannot be obtained by any solid sheet. For example, when sheets having the same thickness and the same strength are comred, the porous sheet can be used for an elastic polymer having higher strength than a solid sheet, and an impact is eased with space portions of pores of the porous sheet, so that the porous sheet is improved in physical properties such as abrasion resistance as comred with the solid sheet. When the pore diameter or the number of the pores is smaller than the above ranges, the porous sheet comes to have properties that are not different from those of the solid sheet. On the other hand, when the pore diameter is larger than the above range or the number of the fine pores is too large, the sheet is decreased in surface smoothness, etc., and fine wrinkles cannot be formed when the sheet is folded, so that the sheet cannot be like quality natural leather. The above fine pores are measured by magnifying a cross section of the sheet at a magnification of 350 times with an electron microscope, and an average thereof is calculated by measuring the fine pores through the entire thickness with a width of 374 $\mu$m.

In the fine pores of the porous sheet, the sizes of the pores are uniformly distributed in the thickness direction. The uniform distribution in the thickness direction means that when a sheet is divided into three layers in parallel with the surface of the sheet such that the thickness is divided, the value of maximum value/minimum value of averages of diameters of the pores of the layers is 1.5 or less, preferably 1.2 or less. While the diameters of the fine pores of each layer obtained by dividing the sheet into three layers is not required to be uniform, the distribution of fine pores of one layer is preferably not different from the distribution of the fine pores of the other layers. When the fine pores are not uniformly distributed in the thickness direction, a layer having fine pores having a larger average diameter is present, and there is a problem that the layer is decreased in strength. When one of the layers has pores having a particularly larger average diameter, undesirably, gaps larger than necessary are formed. When a layer having fine pores having a larger average diameter is present, the layer is caused to have large gaps, the sheet wrinkles to a greater extent when folded, so that the sheet not only has a poor feeling but also decreases in physical properties of portions having such large gaps, which are drawbacks. When a photograph of cross section of the sheet is taken, preferably, the fine pores have the cross-sectional form of an oval since such a form can serve to maintain the strength of the porous sheet.

Preferably, the surface (A) on one side of the porous sheet has 50 to 5,000 opening portions per $mm^2$, and the opening portions have an average opening diameter of 1 to 20 $\mu$m. Further, the average opening diameter is more preferably 3 to 15 $\mu$m, and the number of the opening portions is 100 to 500/$mm^2$. Further, the opening portions preferably have a diameter in the range of from 1 to 30 $\mu$m. When the opening diameter is small, and when the number of the opening portions is small, the moisture permeability of the sheet tends to decrease. When the opening diameter is large, and when the number of the opening portions is large, the appearance of the sheet tends to be poor.

The above surface (A) on one side of the porous sheet refers to a surface that constitutes an outermost surface of a fiber composite sheet formed by laminating the porous sheet on a fiber substrate as will be described later.

The thickness of the above porous sheet is 10 to 500 $\mu$m, preferably 20 to 300 $\mu$m, and the density of the porous sheet based on the presence of the fine pores is 0.5 to 0.9 g/$cm^3$, more preferably 0.6 to 0.8 g$lcm^3$. When the porous sheet has a smaller thickness and a lower density than those described above, the strength of the porous sheet tends to be low. When the porous sheet has a larger thickness and a higher density than those described above, the porous sheet comes to be rubber-like and tends to be poor in feeling.

The porous sheet of the present invention has an organic solvent content of 0.05 wt % or less. Further, the above organic solvent content is preferably 0 to 0.030 wt %. With a decrease in the organic solvent content, an organic solvent that volatilizes from the porous sheet during use decreases, which is preferred in view of environmental protection. Further, preferably, the porous sheet has high resistance to an organic solvent in view of durability. The porous sheet is preferably not soluble in an organic solvent since it causes no change in form when brought into contact with the organic solvent. Therefore, the weight loss of the porous sheet in/with N,N-dimethylformamide (DMF) is 25 wt % or less, preferably 20 wt % or less. Further, the weight loss of the porous sheet in/with methyl ethyl ketone (MEK) is 25 wt % or less, preferably 20 wt % or less, and the weight loss thereof in/with toluene (Tol) is 15 wt % or less, preferably 10 wt % or less. The above organic solvent includes DMF, MEK, toluene, methyl alcohol and isopropyl alcohol.

Concerning the physical properties of the porous sheet, the breaking strength thereof is to 15 N/$mm^2$ and the breaking elongation thereof. Is 100 to 500%. Further, preferably, the breaking strength thereof is 3 to 10 N/mm$^2$ and the breaking elongation thereof is 150 to 300%. When the balance between the strength and the elongation is in the above ranges, there is obtained a preferred balance between the durability and the feeling of a fiber composite sheet. Further, when the porous sheet is elongated by 100%, preferably it has a modulus of 1 to 10 N/mm$^2$. Further, the breaking energy, expressed by [(strength)×(breaking elongation)]/2, is preferably 350 to 3,000 (N/mm$^2$.%).

As a process for producing the porous sheet of the present invention, there is employed a process in which a stable aqueous dispersion (1) containing an elastic polymer (1) and water-repellent particles is prepared, the aqueous dispersion (1) is pre-heated at a temperature of 60 to 90° C. under a condition where the dispersion has a water content of 20 to 80 wt %, and then water is removed.

While the elastic polymer (1) for use is not critical so long as it is a water-dispersible type that can form an aqueous dispersion, it is preferably a polyurethane resin. The water-dispersible type may be any one of a self-emulsifiable type or a forced-emulsifiable type. However, it is preferably a self-emulsifiable type, and a self-emulsifiable polyurethane resin is the most preferred. For improving the physical properties of the elastic polymer, preferably, the aqueous dispersion contains a crosslinking agent. The crosslinking agent includes an epoxy resin, a melamine resin, an isocyanate compound, an aziridine compound and a polycarbodiimide compound. Particularly, an isocyanate-containing crosslinking agent or a carbodiimide-containing crosslinking agent is preferred. The content of the crosslinking agent differs depending upon type of the elastic polymer used and a balance of the required feeling and strength, while the content thereof as a solid based on the elastic polymer is preferably 1 to 10% by weight. For improving the physical properties of the elastic polymer, further, an additive or a stabilizer may be used. For improving the appearance, a colorant and a smoother may be used.

The water-repellent particles are selected from fine particles of a fluorine-containing resin and fine particles of a silicon-containing resin. The water-repellent particles preferably have a diameter of 1 to 10 μm. Of these, a silicon-containing compound that is imparted with hydrophobic properties is preferred, and particularly preferred is methylated silica obtained by reacting a silica surface with an organosilicon compound such as methylsilane, dimethyldichlorosilane or hexamethyldisilane. Further, the impartation with hydrophobic properties can be carried out by mixing a silica suspension and an organic silicon compound, adding an organic solvent to the mixture and separating silica from a liquid phase. The content of the water-repellent fine particles based on the solid content weight of the elastic polymer is preferably 3 to 70% by weight, more preferably 20 to 40% by weight.

Since the water-repellent particles are not directly dispersible in water, a surfactant is used, and they are used in the form of an aqueous dispersion. In the present invention, a surfactant having a cloud point is preferred as a surfactant, and a nonionic surfactant is mainly used.

Further, in the present invention, preferably, the dispersion of the water-repellent particles in water has a cloud point 50 to 90° C. In the method of measuring the above cloud point, the water-repellent particles are dispersed in water in the presence of a surfactant, the aqueous dispersion is adjusted such that the total content of the water-repellent particles and the surfactant is 5% by weight, the thus-prepared dispersion was gradually temperature-elevated from room temperature, and a temperature at which uniformly dispersed particles aggregate is taken as a cloud point.

In the process for the production of a porous sheet in the present invention, advantageously, the aqueous dispersion (1) containing the elastic polymer (1), the water-repellent particles and the crosslinking agent is stable at a temperature of 90° C. or lower. Further, preferably, the above aqueous dispersion is stable at a temperature of 20 to 80° C. Being stable means that the aqueous dispersion keeps its dispersion state without causing any gelling and precipitation. When the aqueous dispersion is unstable at a temperature of 90° C. or lower, for example, when an aqueous dispersion capable of undergoing thermal gelling is used, the aqueous dispersion is poor in sheet formability and causes a sheet to crack, so that it is difficult to produce a uniform porous sheet, and a sheet obtained comes to have low strength and low elongation.

Further, the viscosity of the aqueous dispersion (1) is preferably 500 to 20,000 mPa·s, further preferably 1,500 to 7,000 mPa·s. When the above viscosity is low, it is difficult to maintain pores during preliminary heating, and an application liquid of the aqueous dispersion flows and is liable to hardly form a sheet. When the viscosity is high, the controlling of the sheet thickness during application is liable to be difficult. Further, the solid concentration of the aqueous dispersion is preferably 20 to 50% by weight. When the above concentration is too low, the volatilization of water tends to take a time. When it is too high, the stability of the aqueous dispersion tends to decrease. Properly, the clearance during application is approximately 50 to 600 μm. When the thickness of an applied coating is too small, the number of fine pores is liable to be small.

After the above aqueous dispersion is applied, the applied dispersion is pre-heated at a temperature of 60 to 90° C. Further preferably, the preliminary heating is carried out at a temperature of 65 to 80° C. In this case, a low humidity is preferred for easing the volatilization of water. After the preliminary heating, the applied dispersion is heated such that the dispersion has a water content of 20 to 80% by weight. Further preferably, the heating is carried out such that the applied dispersion has a water content of 30 to 70% by weight. The heating is carried out such that the water content is 30 to 90% of the water content of the applied dispersion that is not yet pre-heated. Further, the above heating is carried out preferably such that the applied dispersion has a water content of 45 to 75% by weight. When the water content is large, water is evaporated in spaces during the removal of water (main drying) that follows, so that large bubbles are formed, and a fine porous structure cannot be constituted. When the drying under the temperature condition of the preliminary heating is carried out such that the water content is small, it takes too much time and a large energy loss occurs. The time period for the preliminary heating is properly adjusted to approximately 1 to 5 minutes.

After the aqueous dispersion (1) is applied on the surface of a substrate formed of a fiber aggregate as a main component or a release paper so as to form a coating having a thickness as required, preferably, the applied dispersion is pre-heated at a temperature which is higher than the cloud point of the aqueous dispersion of the water-repellent particles, preferably higher than the above cloud point by 10° C., and which is not higher than 90° C. When the preliminary heating temperature is higher than the cloud point of the dispersion containing the water-repellent particles, the water-repellent particles are more easily precipitated, and more fine pores tend to be formed. The principle of the above is assumed as follows. The surfactant causing the water-repellent particles to be dispersed loses its emulsification capability, the water-repellent particles aggregate to be solidified in the dispersion of the elastic polymer, water is removed by the water repellency thereof, and when the elastic polymer is solidified, the elastic polymer forms fine pores. When the preliminary heating temperature is 90° C. or higher, it is improper since no pores are formed.

Water is removed (main drying) for volatilizing water that remains after the preliminary heating. While the temperature therefor can be any higher temperature than the preliminary heating temperature, it is preferably between 85° C. and 130° C., more preferably between 95° C. and 105° C. When the above temperature is high, bubbles are liable to be formed. When it is low, drying is liable to take a time too much. Further, when the temperature is set at multi-stage temperatures for the removal of water, the occurrence of bubbles is suppressed, which is desirable. After the preliminary heating, for example, there is employed a method in which the drying is carried out at a temperature between 85° C. and 100° C. and then the drying at a second stage is carried out at a temperature between 105° C. and 130° C.

Further, for forming a pattern on the porous sheet of the present invention, preferably, the above aqueous dispersion (1) is applied onto a release paper, and then, the applied aqueous dispersion (1) is pre-heated to remove water. By forming a sheet on the release paper, the formation of the sheet, the coloring and the pattern-formation can be carried out by one step.

For forming opening portions of fine pores in one surface (A) of the porous sheet, a porous sheet is formed on a release paper or a film and then peeled from the release paper or the film. The opening portions of the fine pores are made in the surface of the porous sheet which is formed by the peeling.

In the process for the production of a porous sheet in the present invention, not an organic solvent type but a water-dispersible elastic polymer is used for forming fine pores. That is because the effect of forming pores with water-repellent particles in a dry method can be produced only in an aqueous dispersion. Further, since the water-dispersible elastic polymer containing no organic solvent is used, the process of the present invention is a process that is free of emission of an organic solvent during processing and is therefore friendly for a global environment. When an organic solvent type elastic polymer is used, it is difficult to prevent the leakage of an organic solvent from the step of production since complete closing is difficult during the heating and the drying of the sheet. Further, since a water-dispersible elastic polymer is used, the residual organic solvent content in the leather-like sheet of the present invention can be easily decreased.

The fiber composite sheet of the present invention is a product in which the above porous sheet is laminated on the surface of a substrate made of a fiber aggregate as a main component. The fiber aggregate for use in the substrate can be selected from various woven or knitted products and a non-woven fabric. Further, the substrate made of a fiber aggregate as a main component preferably contains an elastic polymer (3) as other component in addition to the fiber. Particularly when a non-woven fabric is used as a fiber aggregate, the substrate has lower strength than a substrate made of a knitted or woven product, so that it is preferred to use the elastic polymer (3) for reinforcement and an improvement in feeling. The above substrate includes, for example, those which are used as a substrate for conventional known artificial leather and synthetic leather.

Most preferably, the substrate is, for example, a non-woven fabric made of a very fine fiber from a polyester, polyamide or polyester/polyamide mixed fiber that can be made very fine, such as a sea-island type mixture spun fiber, a composite spun fiber or a separable composite fiber, and which forms very fine fibers having a monofilament size of 0.01 to 1.0 dtex, preferably 0.1 to 0.5 dtex. Further, it is properly a fiber aggregate increased in density. Further, it is particularly preferably a substrate formed of a fiber aggregate impregnated with the elastic polymer (3) solidified. As an elastic polymer (3), polyurethane is preferably used. Further, when a water-dispersible polyurethane which has heat-sensitive coagulation properties is used, there can be formed a substrate whose organic solvent content is small and which is environmentally friendly.

Further, when a knitted or woven product impregnated with no elastic polymer (3) as a substrate is used, there can be obtained a fiber composite sheet having unique feeling.

When a very fine fiber is used as a substrate to constitute the fiber aggregate, the sheet is improved in feeling. Further, the elastic polymer (2) of an adhesive layer intertwines with the very fine fibers of a fiber composite sheet, and a mechanical anchor effect increases, so that the fiber composite sheet is improved in physical properties.

Further, for improving the above elastic polymer (3) in physical properties and for improving the substrate in feeling, other components including a stabilizer such as an antioxidant and a crosslinking agent such as an isocyanate compound may be incorporated.

Properly, elastic polymer is present in gaps among fibers of the substrate and the substrate has a density of 0.2 to 0.6 g/cm$^3$, preferably 0.3 to 0.5 g/cm$^3$.

In the fiber composite sheet of the present invention, the abrasion resistance of the surface where the porous sheet is present is preferably at least 120 times, more preferably at least 150 times, still more preferably 200 to 500 times. The abrasion resistance can be adjusted on the basis of the strength of the porous sheet and the diameter and number of fine pores. The above abrasion resistance refers to a number of times measured by carrying out a test until fluffing occurs, according to the method of JIS L-1079 in which a Calibrade H22 supplied by Taber Industries is used as an abrasive wheel and a load is set at 98 N.

When the fiber composite sheet of the present invention is measured according to JIS K-6549, preferably, the moisture permeability thereof is 1 to 10 g1cm$^2$·hr, preferably 2 to 6 mg/cm$^2$·hr. The moisture permeability can be adjusted on the basis of the diameter and number of fine pores in the surface.

Preferably, an adhesive layer made of the elastic polymer (2) is present in the interface between the above substrate and the porous sheet, and the adhesive layer improves flex resistance and adhesion strength. A sheet formed of the porous sheet and the adhesive layer is required to have physical properties equivalent to those of the porous sheet. The above sheet preferably has a strength of 1 to 15 N/mm$^2$ and a breaking elongation of 100 to 500%. Further, the sheet more preferably has a strength of 3 to 10 N/mm$^2$ and a breaking elongation of 150 to 300%. When the fiber composite sheet is formed with the balance between the strength and the elongation within the above ranges, there is attained a preferred balance between the durability and the feeling. Further, the modulus at a 100% elongation is preferably 1 to 10 N/mm$^2$. Further, the breaking energy expressed by (strength)×(breaking elongation) is preferably 350 to 3,000 (N/mm$^2$) %.

Further, the leather-likeness index of the fiber composite sheet, obtained by dividing a flexural compression stress with a flexural hardness, is preferably 25 to 100, more preferably 50 to 100. The leather-likeness index means that with an increase in the value of the index, the fiber composite sheet has richer softness and higher nerve. A larger leather-likeness index value means that the fiber composite sheet having such a larger leather-likeness index value has properties closer to those of natural leather. The above value is accomplished by adjusting the modulus of each elastic polymer and contents and bonding state of the fiber and the elastic polymer in the substrate.

In the process for the production of a fiber composite sheet in the present invention, the above porous sheet of the present invention is used.

As a method for bonding the substrate made of a fiber aggregate as a main component and the porous sheet, there may be employed a laminating method that is conventional known per se. Further, the aqueous dispersion (1) of the elastic polymer (1) can be directly applied onto the substrate, to form a fiber composite sheet.

However, the process for the production of a fiber composite sheet is most preferably a process of applying the aqueous dispersion (2) of the elastic polymer (2) onto the above porous sheet, then, laminating the substrate made of the fiber aggregate as a main component thereon to form a laminate, then, heating the laminate in an atmosphere at 100 to 150° C. for at least 3 seconds but not longer than 5 minutes, preferably for 1 minutes or less, and further, nipping the laminate between a hot roll at 100 to 150° C., preferably 140° C. or lower, more preferably between 120° C. and 130° C., to bond the above members.

By the use of the aqueous dispersion (2) of the elastic polymer (2), the content of an organic solvent in the fiber composite sheet can be easily decreased, the volatilization of the organic solvent in a bonding step can be suppressed, an operation in a closed system can be avoided, and an operation in an open system can be carried out.

The aqueous dispersion of the elastic polymer (2) for forming the adhesive layer in the present invention may be any aqueous dispersion so long as it exhibits elastomer properties after removal of water. The above aqueous dispersion includes, for example, elastic polymer emulsions such as polyurethane emulsion, NBR emulsion, SBR emulsion and acryl emulsion. Of these, polyurethane-emulsion, particularly, a polycarbonate-containing polyurethane emulsion is preferred in view of flexibility, strength and weatherability.

For improving the above elastic polymer (2) in physical properties and for improving the substrate in feeling, other components including a stabilizer such as an antioxidant and a crosslinking agent such as an isocyanate compound may be incorporated.

When the porous sheet is formed on a release paper for patterning the porous sheet, preferably, the aqueous dispersion (2) of the elastic polymer (2) is applied onto the porous sheet in a state where the porous sheet is not peeled off from the release paper, the substrate made of a fiber aggregate as a main component is laminated thereon to form a laminate, then, the laminate is heated in an atmosphere at 100 to 150° C. for 10 seconds to 5 minutes, the laminate is nipped with a hot roll at 100 to 150° C. to bond the above members, further, the laminate is aged in an atmosphere at 50 to 70° C. for 16 to 48 hours and then the release paper is peeled off from the fiber composite sheet.

The thus-obtained fiber composite sheet has features that it is excellent in moisture permeability and the feeling of fine wrinkles and is formable directly on a release paper. Further, since no organic solvent is used, the fiber composition sheet has features that it is environmentally friendly with respect to its production step and its end product.

EXAMPLES

The present invention will be explained further in detail with reference to Examples hereinafter, while the present invention shall not be limited by these Examples. In Examples and Comparative Examples, "part" and "%" are based on weight unless otherwise specified. Measurement values in Examples were obtained by measurements according to the following methods.

(1) Viscosity measurement method

A solution was measured for a viscosity with a Brookfield viscometer with a rotor No. 4 at a revolution rate of 30 rpm at a temperature of 20° C.

(2) Breaking strength/elongation and breaking energy

A 90 mm×10 mm test piece is prepared. With a tensilon RTC-1210 (supplied by Orientec K.K.), and the test piece is fixed to a load cell at a rated load of 490 N and measured at a test width of 10 mm, at an initial sample length of 50 mm, at a cross head speed of 200 mm/minute and at a recording paper speed of 200 mm/minute. A value on the recording paper are read and converted to a stress per $mm^2$ of the test piece, and the stress is taken as a breaking strength and expressed with a unit of $N/mm^2$. The elongation at break is expressed by %. The breaking energy is calculated on the basis of the expression of breaking energy=(breaking strength×breaking elongation)×½.

(3) Measurement of pore diameters

An electron microscope photograph of a sample having thickness of 10 mm was taken at a magnification of 350 times, and pores present in a width of 374 μm were measured for sizes and number. Converted diameter=(diameter in perpendicular direction (vertical diameter)+diameter in horizontal direction (lateral diameter))×½

(4) Measurement of organic solvent amount

A sample was extracted in acetone at 40° C. for 1 hour, and an extract was analyzed with a gas chromatograph. The analysis was carried out with respect to DMF (N,N-dimethylformamide), MEK (methyl ethyl ketone) and toluene, and the detection limits of these by the above method were 0.03 wt %, 0.01 wt % and 0.01 wt % based on the weight of a leather-like sheet as a sample, respectively.

(5) Measurement of weight loss in organic solvent

A 5 cm×5 cm sample is prepared and measured for a weight ($W_0$). The sample is immersed in a beaker containing an organic solvent (dimethylformamide (DMF), methyl ethyl ketone (MEK) or toluene (TOL)), and the organic solvent is stirred for 5 minutes. Then, the sample piece is taken out and dried with a dryer at 120° C. for 5 minutes. The dried sample piece was measured for a dry weight ($W_1$). The weight loss is calculated on the basis of the expression of weight loss (%)=$(W_0-W_1)/W_0 \times 100$.

(6) Abrasion resistance

Measured according to JIS L-1079. That is, a sample piece having a diameter of 12.5 cm is prepared, and a hole is made in the center of the test piece. A gum tape is attached to the reverse surface of the test piece and set on a sample bed. A Calibrade H22 of Taber Industries is used as an abrasive wheel, and under a load of 98N, the abrasive, wheel is rotated until fluffing occurs. The number of times of rotation before the fluffing occurs is taken as abrasion resistance.

(7) Measurement of moisture permeability

Measured according to JIS K-6549. That is, a test piece having a diameter of 7.0 cm is prepared, a petri dish having a diameter of 6 cm and having 7 g of calcium chloride in it is placed in a moisture-permeable cup horizontally placed, and the test piece is placed thereon with its surface facing upward. Then, a weight is placed on the surface, and the test piece is circumferentially sealed with a molten wax (in this case the test piece has a moisture permeation area, which constitutes a measurement sample having a diameter of 6 cm). When the wax is solidified, the weight is removed, and the petri dish is covered to prevent the penetration of moisture. The weight at this moment is taken as $A_0$ (mg). The cover is removed, and the petri dish is placed in a constant-temperature constant-humidity device having a temperature of 30° C. ±0.5° C. and a relative humidity of 80% ±5%. After 1 hour, the petri dish is taken out of the device, covered, and measured for a weight. The weight at this moment is taken as $A_1$ (mg). Again, the cover is removed and the petri dish is placed in the constant-temperature constant-humidity device having a temperature of 30° C. ±0.5° C. and a relative humidity of 80%±5%. After 1 hour, the petri dish is taken out of the device, covered, and measured for a weight. The weight at this moment is taken as $A_2$. The moisture permeability is determined on the basis of the following expression.

Moisture permeability $(mg/cm^2 \cdot hr)=$ (average increment per hour)/(permeation area of test piece)=

$\{(A_1-A_0)+(A_2-A_1)\}/2 \cdot 28.3$ (8) Leather-likeness index

Natural leather has features that it has flexibility and nerve produced by denseness and uniformity of its structure. As an index therefor, (flexural compressive stress)/(flexural hardness) is used as a leather-likeness index. The flexural compressive stress and the flexural hardness were measured as follows.

(8-1) Flexural hardness

A 25 mm×90 mm test piece is held to a fixing tool in a position 20 mm far from one end. In a position 20 mm far from the other end of the test piece, the test piece was bent at 90 degrees with a curvature of 20 mm, and 5 minutes after the test piece is bent, the test piece is measured for a resilient force. The measured value is converted to a value per cm of a width, and the value is taken as a flexural hardness (flexibility) and expressed with a unit of mN/cm.

(8-2) Flexural compressive stress

A 2.5 cm×9.0 cm test piece is bent in a position 30 mm far from one end, and fixed between a flat plate and a U gauge measuring plate which are set 20 mm distant from each other. Then, the U gauge measuring plate is moved downward at a rate of 10 mm/minute while the U gauge measuring plate is maintained at a horizontal position with respect to the flat plate, to compress the test piece. When the distance between the flat plate and the U gauge measuring plate comes to be 5 mm, a stress value is read from a measuring meter, the stress value is converted to a value per cm of a width, and the value is taken as a flexural compressive stress (nerve) and expressed with a unit of mN/cm.

(9) Flexing fatigue test

A 70 mm×45 mm test piece is prepared, the surface of one end of the test piece is folded inside, the surface of the other end is folded outside, and these ends of the test piece are fit to clamps of a flexometer (supplied by Yasuda Seiki K.K.). One clamp is fixed, and other clamp is moved in a reciprocation motion to flex the test piece 200,000 times at room temperature. Then, the state of the test piece is evaluated and expressed on the basis of the following ratings.

Generally, with an increase in grades, there are more cases where a skin layer and an impregnation layer bond to each other, and a product is superior in the feeling of fine wrinkles when it is folded.

Grade 1: Fibers penetrate part of a skin layer, or marked cracking occurs, so that such a product is not usable.

Grade 2: Marked cracking occurs.

Grade 3: Cracking occurs to a nearly large degree.

Grade 4: Cracking occurs to a little degree.

Grade 5: No cracking occurs.

(10) Measurement of cloud point

An aqueous dispersion containing water-repellent particles dispersed in water with a surfactant was prepared such that the total content of the water-repellent particles and the surfactant is 5% by weight, and the aqueous dispersion is gradually temperature-elevated from room temperature. A temperature at which uniformly dispersed particles form aggregates is taken as a cloud point.

Preparation of substrate

A separable divisible composite fiber of a parent yarn having a size of 4.4 dtex, containing a shrinkable polyethylene terephthalate as a first component and nylon-6 as a second component and having a 16-divident gear type cross section was subjected to fiber-combining and dividing treatment by needle punching and high-pressure water stream intertwining treatments, to form a non-woven fabric having a thickness of 1.15 mm and a basis weight of 265 g/m$^2$. The above non-woven fabric from the dividing treatment was immersed in a warm water vessel at 75° C. for 20 seconds, to shrink the polyethylene terephthalate fiber as a first component so that the entire area was contracted by 21%, whereby there was obtained a contracted non-woven fabric that was a dry fiber aggregate. The above contracted non-woven fabric was used as a fibrous substrate. It had a thickness of 1.2 mm and a basis weight of 380 g/m$^2$.

Then, the above contracted non-woven fabric was impregnated with a water dispersible polyurethane which has heat sensitive coagulation properties (Hydran V-2114, supplied by Dainippon Ink & Chemicals Inc., solid content concentration 40%, a heat-sensitive coagulation temperature 75° C.), superfluous dispersion on the surface was scraped off, and the polyurethane was coagulated at a temperature of 97° C. in a saturated water vapor atmosphere over 1 minute. Further, the non-woven fabric was treated in a hot water vessel at 97° C. for 1 minute and dried with a hot air dryer at 110° C. The thus-obtained substrate had a thickness of 1.2 mm and an apparent density of 0.38 g/cm$^3$ and had a fiber: polymer weight ratio of 100:30. The above substrate was used as an impregnated substrate formed of a fiber aggregate and an elastic polymer. The above substrate was measured for a residual organic solvent amount, to show that the amount was lower than the detection limit.

Example 1

Preparation of Porous Sheet

An aqueous dispersion (1) containing 100 parts by weight of an aqueous self-emulsifiable polyurethane resin as a water-dispersible elastic polymer, 50 parts by weight of water-repellent fine particles. 4 parts by weight of a crosslinking agent, 1 part by weight of a thickener and 5 parts by weight of a water-dispersible black pigment was prepared as a formulated liquid for a film layer. The above aqueous dispersion (1) had a viscosity of 3,450 mPa·s at 20°

C. When left in a 90° C. atmosphere for 30 minutes, the aqueous dispersion underwent neither coagulation nor precipitation, and it retained a solution state.

The particulars of components used above are as follows.

Aqueous self-emulsifiable polyurethane resin: Hydran TMS-172 supplied by Dainippon Ink & Chemicals, solid content concentration 35% by weight.

Water-repellent fine particles: A mixture of water-repellent fine particles S-21 (supplied by Matsumoto Yushi-Seiyaku Co., Ltd., methylated silica content 12%, cloud point 56° C., solid content concentration 20% by weight) and water-repellent fine particles C-10 (supplied by Matsumoto Yushi-Selyaku Co., Ltd., methylated silica content 5.9%, cloud point 56° C., solid content concentration 30% by weight) in a mixing ratio of 3:2.

Crosslinking agent: Hydran WL Assister C3(isocyanate-containing crosslinking agent, supplied by Dainippon Ink & Chemicals).

Thickener: Hydran WL Assister T1 (urethane-containing thickener, supplied by Dainippon Ink & Chemicals).

Water-dispersible black pigment: DISPERSE HG-950 (supplied by Dainippon Ink & Chemicals).

Then, the above aqueous dispersion (1) was applied onto a release paper (AR-144SM, thickness 0.25 mm, supplied by Asahi Roll K.K.) to form a 300 μm thick coating (wet), and the applied aqueous dispersion was first heated at 70° C. for 3 minutes. In this case, the coating had a water content of 60% by weight. Then, the coating was dried at 95° C. for 3 minutes and dried at 120° C. for 10 minutes, thus the drying being carried out at three stages, to form a porous sheet 1 having a thickness of 0.10 mm and a basis weight of 59 g/m².

Concerning physical properties, the thus-obtained porous sheet had a density of 0.59 g/cm³, a breaking strength of 5.2 N/mm², a breaking elongation of 222%, a 100% modulus of 3.0 N/mm² and a breaking energy of 577 (N/mm²).%. Further, concerning porous diameters of cross section of the film, pores of each layer sharing ⅓ of the thickness of the film were measured for an average diameter, to show that almost no distribution of sizes of the diameters in the thickness direction was found, and the ratio of a maximum value of the average diameters and a minimum value of the average diameters of the layers was 1.04. The average diameter of the entire layers was 4.6 μm, and the fine pores had a minimum diameter of 1.5 μm and a maximum diameter of 18.0 μm. Further, the number of the pores was 203 (observation covering a thickness 79 μm×width 374 μm, a converted value 6,871 pores/mm²). Concerning diameters and number of the pores in the surface, the pores had an average diameter of 12.0 μm, a minimum diameter of 1.5 μm and a maximum diameter of 23.0 μm, and the number of the pores was 30 (observation covering 252 μm×374 μm, a converted value 318 pores/mm²). The weight losses in DMF, MEK and TOL were 11 wt %, 10 wt % and 4 wt %. Further, the residual organic solvent amount measured was lower than the detection limit. Table 1 summarizes the physical properties.

Example 2

Preparation of Porous Sheet 2

The aqueous dispersion (1) prepared in Example 1 was applied onto a release paper (AR-144SM, thickness 0.25 mm, supplied by Asahi Roll K.K.) to form a 1,000 μm thick coating (wet), and the applied aqueous dispersion was first heated at 70° C. for 8 minutes. In this case, the coating had a water content of 62% by weight. Then, the coating was dried at 95° C. for 8 minutes and dried at 120° C. for 15 minutes, thus the drying being carried out at three stages, to form a porous sheet 2 having a thickness of 0.33 mm and a basis weight of 201 g/m².

While the porous sheet had a large thickness, pores were uniformly distributed all from a skin layer to an internal layer. Table 1 shows physical properties of the obtained porous sheet 2.

Example 3

Preparation of Porous Sheet 3

The aqueous dispersion (1) prepared in Example 1 was applied onto a release paper (AR-144SM, thickness 0.25 mm, supplied by Asahi Roll K.K.) to form a 100 μm thick coating (wet), and the applied aqueous dispersion was first heated at 70° C. for 1 minute. In this case, the coating had a water content of 52% by weight. Then, the coating was dried at 95° C. for 1 minute and dried at 120° C. for 3 minutes, thus the drying being carried out at three stages, to form a porous sheet 3 having a thickness of 0.03 mm and a basis weight of 19.0 g/m².

While the porous sheet had a small thickness, pores were uniformly distributed. Table 1 shows physical properties of the obtained porous sheet 3.

Comparative Example 1

For a formulation excluding the water-repellent fine particles, an aqueous dispersion containing 106 parts by weight of an aqueous self-emulsifiable polyurethane resin as a water-dispersible elastic polymer, 4 parts by weight of a crosslinking agent, 0.25 part by weight of a thickener, 5 parts by weight of a water-dispersible black pigment, 0.2 part by weight of a leveling agent and 0.3 part by weight of an anti-foamer was prepared as a formulated liquid for a film layer. The above aqueous dispersion had a viscosity of 3,950 mPa·s at 20° C.

The particulars of components used above are as follows.

Aqueous self-emulsifiable polyurethane resin: Hydran TMS-172 supplied by Dainippon Ink & Chemicals, solid content concentration 35% by weight.

Crosslinking agent: Hydran WL. Assister C3 (isocyanate-containing crosslinking agent, supplied by Dainippon Ink & Chemicals).

Thickener: Hydran WL Assister T1 (urethane-containing thickener, supplied by Dainippon Ink & Chemicals).

Water-dispersible black pigment: DISPERSE HG-950 (supplied by Dainippon Ink & Chemicals).

Leveling agent; Hydran WL Assister W1 (supplied by Dainippon Ink & Chemicals).

Anti-foamer: Hydran Assister D1 (supplied by Dainippon Ink & Chemicals).

The above formulated liquid for a film layer was applied onto a release paper (AR-144SM, thickness 0.25 mm, supplied by Asahi Roll K.K.) to form a 300 μm thick coating (wet), and the applied liquid was first heated at 70° C. for 2 minutes and then dried at 110° C. for 4 minutes, to form a polyurethane resin film.

The thus-obtained film was not a porous film but a solid film.

Comparative Example 2

The aqueous dispersion (1) prepared in Example 1 was applied onto a release paper (AR-144SM, thickness 0.25 mm, supplied by Asahi Roll K.K.) to form a 100 μm thick coating (wet), and the applied aqueous dispersion was dried at 120° C. for 6 minutes.

The obtained sheet had cracking and was not any uniform sheet that could be measured for breaking strength and elongation. The sheet was without any pores and was a solid sheet.

Comparative Example 3

An aqueous dispersion for a formulated liquid for a film layer was prepared in the same manner as in Example 1 except that the aqueous self-emulsifiable polyurethane resin used in the aqueous dispersion (1) in Example 1 was replaced with 100 parts of a polyurethane resin which has heat-sensitive coagulation properties (Hydran V-2114, supplied by Dainippon Ink & Chemicals, heat-sensitive coagulation temperature 75° C., solid content concentration 40% by weight). The above aqueous dispersion had a viscosity of 1,450 mPa·s at 20° C., and when left in a 90° C. atmosphere for 30 minutes, the aqueous dispersion underwent heat-sensitive coagulation.

Then, the above aqueous dispersion was applied onto a release paper (AR-144SM, thickness 0.25 mm, supplied by Asahi Roll K.K.) to form a 300 μm thick coating (wet), and the applied aqueous dispersion was first heated at 70° C. for 3 minutes. In this case, the coating had a water content of 60% by weight. Then, the coating was dried at 95° C. for 3 minutes and dried at 120° C. for 10 minutes, thus the drying being carried out at three stages, to form a sheet having a thickness of 0.10 mm and a basis weight of 62 g/m².

While the thus-obtained sheet was porous, it had cracking and was not any uniform sheet that could be measured for breaking strength and elongation. In this connection, the sheet had a thickness of 0.10 mm, a basis weight of 62 g/m² and a density of 0.62 g/cm³.

Comparative Example 4

An aqueous dispersion containing 100 parts by weight of a polyurethane resin which has heat-sensitive coagulation properties (Hydran V-2114, supplied by Dainippon Ink & Chemicals, heat-sensitive coagulation temperature 75° C., solid content concentration 40% by weight), 1 part by weight of a urethane-containing thickener (Hydran WL Assister T1, supplied by Dainippon Ink & Chemicals) and 300 parts by weight of water was prepared as a formulated liquid for a film layer. The above aqueous dispersion had a viscosity of 850 mPa·s at 20° C., and when left in a 90° C. atmosphere for 30 minutes, the aqueous dispersion underwent heat-sensitive coagulation.

Then, the above aqueous dispersion was applied onto a PET film to form a 500 μm thick coating (wet), and the applied aqueous dispersion was first thermally coagulated with a steamer for 90 seconds and then in a 70° C./63% atmosphere for 20 minutes, followed by final drying at 110° C. for 10 minutes.

While the thus-obtained sheet was porous, it had cracking and was not any uniform sheet that could be measured for breaking strength and elongation. The sheet had a thickness of 0.06 mm, a basis weight of 42 g/m² and a density of 0.70 g/cm³.

The same formulated liquid as the above formulated liquid for a film layer was applied onto a PET film to form a 250 μm thick coating (wet), and the applied aqueous dispersion was first thermally coagulated with a steamer for 90 seconds and then in a 70° C./63% atmosphere for 20 minutes, followed by final drying at 110° C. for 10 minutes. The thus-obtained sheet had cracking and was not any uniform sheet that could be measured for breaking strength and elongation. Further, it was a solid sheet free of any pores. Example 4 (Preparation of porous sheet 4).

A formulated liquid (5,450 mPa·s, 20° C.) for a film layer as an aqueous dispersion was prepared in the same manner as in Example 1 except that the amount of the water-repellent fine particles of the aqueous dispersion (1) in Example 1 was changed from 50 parts by weight to 75 parts by weight. When left in a 90° C. atmosphere for 30 minutes, the above aqueous dispersion underwent neither coagulation nor precipitation and maintained a solution state.

Then, the above aqueous dispersion was applied onto a release paper (AR-144SM) to form a 300 μm thick coating (wet), and the coating was first heated at 70° C. for 3 minutes. In this case, the coating had a water content of 63% by weight. Then, the coating was dried at 95° C. for 3 minutes and dried at 120° C. for 10 minutes, thus the drying being carried out at three stages, to form a porous sheet 4 having a thickness of 0.10 mm and a basis weight of 53 g/m².

Table 1 shows physical properties of the thus-obtained porous sheet 4.

Example 5

Preparation of Porous Sheet 5

A formulated liquid (3,150 mPa·s, 20° C.) for a film layer as an aqueous dispersion was prepared in the same manner as in Example except that the amount of the water-repellent fine particles of the aqueous'dispersion (1) in Example 1 was changed from 50 parts by weight to 25 parts by weight. When left in a 90° C. atmosphere for 30 minutes, the above aqueous dispersion underwent neither coagulation nor precipitation and maintained a solution state.

Then, the above aqueous dispersion was applied onto a release paper (AR-144SM) to form a 300 μm thick coating (wet), and the coating was first heated at 70° C. for 3 minutes. In this case, the coating had a water content of 58 by weight. Then, the coating was dried at 95° C. for 3 minutes and dried at 120° C. for 10 minutes, thus the drying being carried out at three stages, to form a porous sheet 5 having a thickness of 0.10 mm and a basis weight of 61 g/m².

Table 1 shows physical properties of the thus-obtained porous sheet 5.

Example 6

Preparation of Porous Sheet 6

A formulated liquid (4,550 mPa·s, 20° C.) for a film layer as an aqueous dispersion was prepared in the same manner as in Example 1 except that the water-repellent fine particles having a cloud point of 56° C. in the aqueous dispersion (1) in Example 1 was replaced with water-repellent fine particles (methylated silica content 16%, solid content concentration 30% by weight) having a cloud point of 70° C. and that the amount thereof was changed from 50 parts by weight to 25 parts by weight.

Then, the above aqueous dispersion was applied onto a release paper (AR-144SM) to form a 300 μm thick coating (wet), and the coating was first heated at 70° C. for 3 minutes. In this case, the coating had a water content of 56% by weight. Then, the coating was dried at 95° C. for 3 minutes and dried at 120° C. for 10 minutes, thus the drying being carried out at three stages, to form a porous sheet 6 having a thickness of 0.08 mm and a basis weight of 68 g/m².

Table 1 shows physical properties of the thus-obtained porous sheet 6.

minutes, and attached to a substrate made of a fiber aggregate and an elastic polymer in Referential Example. The thus-prepared laminate was pre-heated for 15 seconds while the release paper was kept in contact with a hot cylinder (surface temperature 130° C.), then, hot-nipped with the above hot cylinder under the condition of a clearance of 1.0

TABLE 1

|  | Ex. 1 | Ex. 2 | Ex. 3 | Ex. 4 | Ex. 5 | Ex. 6 |
|---|---|---|---|---|---|---|
| Porous sheet No. | 1 | 2 | 3 | 4 | 5 | 6 |
| Basis weight (g/m²) | 59 | 201 | 19 | 58 | 61 | 68 |
| Thickness (mm) | 0.10 | 0.33 | 0.03 | 0.10 | 0.10 | 0.08 |
| Density (g/cm³) | 0.59 | 0.61 | 1.63 | 0.58 | 0.61 | 0.85 |
| Breaking strength (N/mm²) | 5.2 | 13.8 | 1.8 | 4.2 | 6.7 | 7.2 |
| Breaking elongation (%) | 222 | 212 | 266 | 188 | 260 | 276 |
| 100% Mod | 3.0 | 5.2 | 0.9 | 2.5 | 3.3 | 3.9 |
| Breaking energy | 575 | 1,569 | 266 | 395 | 871 | 994 |
| Average particle diameter of pores in cross section (μm) | 4.6 | 4.9 | 4.5 | 4.3 | 4.7 | 4.3 |
| Ratio of average diameters of three layers | 1.04 | 1.31 | 1.05 | 1.01 | 1.19 | 1.22 |
| Minimum diameter (μm) | 1.5 | 1.5 | 1.5 | 1.5 | 1.5 | 1.5 |
| Maximum diameter (μm) | 18.0 | 19.5 | 16.5 | 17.0 | 18.0 | 16.0 |
| Number of pores (pores/mm²) | 6,871 | 7,175 | 4,278 | 9,748 | 3,553 | 1,422 |
| Average diameter of pores in surface (μm) | 12.0 | 13.0 | 11.5 | 11.0 | 12.5 | 10.0 |
| Minimum diameter (μm) | 1.5 | 1.5 | 1.5 | 1.5 | 1.5 | 1.5 |
| Maximum diameter (μm) | 23.0 | 25.0 | 21.0 | 22.0 | 23.5 | 19.0 |
| Number of pores (pores) | 30 | 25 | 20 | 45 | 16 | 10 |
| Converted value (pores/mm²) | 318 | 265 | 212 | 477 | 170 | 106 |
| Weight loss |  |  |  |  |  |  |
| DMF (wt %) | 11 | 12 | 11 | 12 | 10 | 10 |
| MEK (wt %) | 10 | 12 | 11 | 11 | 10 | 10 |
| Tol (wt %) | 4 | 5 | 4 | 4 | 4 | 4 |
| Residual organic solvent amount | LTL* | LTL* | LTL* | LTL* | LTL* | LTL* |

Notes:
Ex. = Example, LTL* = Lower than limit

Example 7

Preparation of Fiber Composite Sheet 1

For a formulated liquid for an adhesive, an aqueous dispersion (2) containing 100 parts by weight of an aqueous self-emulsifiable polyurethane resin that was a water-dispersible elastic polymer but was a lower-molecular-weight type, 10 parts by weight of a crosslinking agent, 1 part by weight of a thickener and 5 parts by weight of a water-dispersible black pigment was prepared as a formulated liquid for a film layer. The above aqueous dispersion (2) had a viscosity of 6,250 mPa·s at 20° C., and when left at a 90° C. atmosphere for 30 minutes, the aqueous dispersion (2) underwent neither coagulation nor precipitation and maintained a solution state.

The particulars of components used above are as follows.

Aqueous self-emulsifiable polyurethane resin: Hydran TMA-168 supplied by Dainippon Ink & Chemicals, solid content concentration 45% by weight, a low-molecular-weight type.

Crosslinking agent: Hydran WL Assister C3 (isocyanate-containing crosslinking agent, supplied by Dainippon Ink & Chemicals).

Thickener: Hydran WL Assister T1 (urethane-containing thickener, supplied by Dainippon Ink & Chemicals).

Water-dispersible black pigment: DISPERSE HG-950 (supplied by Dainippon Ink & Chemicals).

The aqueous dispersion (2) that was an adhesive formulated liquid was applied onto the porous sheet 1 obtained in Example 1, so as to form a 150 μm thick coating (wet) having a dry weight of 60 g/m². After the application, the applied aqueous dispersion was heated at 70° C. for 2 minutes, and further, cured at 120° C. for 2 minutes. Further, the laminate was aged at 50° C. for 24 hours, and the release paper was peeled off, to give a grain-toned artificial leather-like sheet that was a fiber composite sheet 1.

For measuring the elastic polymer layer of the thus-obtained fiber composite sheet for physical properties, the aqueous dispersion (2) was applied to the porous sheet 1 in the above application amount, and dried without attaching the substrate, to prepare a sheet. The above sheet had a basis weight of 123 g/m², a thickness of 0.16 mm, a density of 0.769 g/cm³, a breaking strength of 5.6 N/mm² and a breaking elongation of 143%. The above sheet had a two-layered structure consisting of a layer having pores and a layer having no pores. The weight losses thereof in DMF, MEK and TOL were 13 wt %, 13 wt % and 6 wt %. When the sheet was measured for a residual organic solvent amount, it was lower than the detection limit.

Further, the above-obtained fiber composite sheet 1 showed an abrasion resistance of 235 times and a moisture permeability of 2.1 mg/cm²·hr and was excellent in the feeling of fine wrinkles. Further, the fiber composite sheet 1 had a flexural hardness of 0.7 g/cm, a flexural compressive stress of 40 g/cm and a leather-likeness index of 57. Further, it showed a flexing fatigue property of grade 3.

Tables 2 and 3 show physical properties thereof.

Examples 8 to 12

Preparation of Fiber Composite Sheets 2 to 6

Grain-toned artificial leather-like sheets that were fiber composite sheets 2 to 6 and excellent in the feeling of fine wrinkles were obtained in the same manner as in Example 7 except that the porous sheet 1 obtained in Example 1 was replaced with the porous sheets 2 to 6 obtained in Examples 2 to 6.

Table 3 shows physical properties thereof.

Comparative Example 5

Preparation of Fiber Composite Sheet

A grain-toned artificial leather-like sheet that was a fiber composite sheet was obtained in the same manner as in Example 7 except that the porous sheet 1 obtained in Example 1 was replaced with the porous sheet obtained in Comrative Example 1. Table 2 shows physical properties thereof.

Example 13

Preparation of Fiber Composite Sheet 13

An aqueous dispersion (3) that was a mixture of the formulated liquid for an adhesive in Example 7 with water-repellent fine particles, i.e., the aqueous dispersion (3) contained 100 parts by weight of an aqueous self-emulsifiable polyurethane resin, 50 parts by weight of the water-repellent fine particles., 10 parts by weight of a crosslinking agent, 1 part by weight of a thickener and 5 parts by weight of a water-dispersible black pigment, was prepared as a formulated liquid for an adhesive. The above aqueous dispersion (3) had a viscosity of 4,200 mPa·s at 20° C. and when left at a 90° C. atmosphere for 30 minutes, the aqueous dispersion (3) underwent neither coagulation nor precipitation and maintained a solution state.

The above water-repellent fine particles were the same as those used in Example 1 and are as follows.

Water-repellent fine particles: A mixture of water-repellent fine particles S-21 (supplied by Matsumoto Yushi-Seiyaku Co., Ltd., methylated silica content 12%, cloud point 56° C., solid content concentration 20% by weight) and water-repellent fine particles C-10 (supplied by Matsumoto Yushi-Seiyaku Co. Ltd., methylated silica content 5.9%, cloud point 56° C., solid content concentration 30% by weight) in a mixing ratio of 3:2.

The aqueous dispersion (3) that was an adhesive formulated liquid was applied onto the porous sheet 1 obtained in Example 1, so as to form a 250 μm thick coating (wet) having a dry weight of 50 g/m². The applied aqueous dispersion was heated at 70° C. for 3 minutes, and attached to a contracted non-woven fabric made of a fiber aggregate alone in Referential Example. The thus-prepared laminate was pre-heated for 15 seconds while the release paper was kept in contact with a hot cylinder (surface temperature 130° C.), then, hot-nipped with the above hot cylinder under the condition of a clearance of 1.0 mm, and further, cured at 120° C. for 2 minutes. Further, the laminate was aged at 50° C. for 24 hours, and the release paper was peeled off, to give a grain-toned artificial leather-like sheet as a fiber composite sheet 13.

For measuring the elastic polymer layer of the thus-obtained fiber composite sheet for physical properties, there was prepared a sheet that was formed of the porous sheet 1 and the aqueous dispersion (3) and obtained by drying without attaching the applied aqueous dispersion to any contracted non-woven fabric. The sheet had a basis weight of 99 g/m² a thickness of 0.16 mm, a density of 0.619 g/cm³, a breaking strength of 4.6 N/mm² and a breaking elongation of 190%. The above sheet had pores that extended through all the layers. The weight losses thereof in DMF, MEK and TOL were 11 wt %, 10 wt % and 4 wt %. When the sheet was measured for a residual organic solvent amount, it was lower than the detection limit.

Further, the obtained artificial leather was excellent in abrasion resistance and moisture permeability. The artificial leather showed an abrasion resistance of 256 times and a moisture permeability of 3.2 mg/cm²·hr. It had a flexural hardness of 0.3 g/cm, a flexural compressive stress of 19 g/cm and a leather-likeness index of 63. Further, it showed a flexing fatigue property of grade 3. Tables 2 and 3 show physical properties.

TABLE 2

|  | Ex. 7 | Ex. 13 | C.Ex. 5 |
|---|---|---|---|
| Elastic polymer layer |  |  |  |
| Presence of pore | Yes | Yes | No |
| Density (g/cm³) | 0.769 | 0.619 | 1.034 |
| Fiber composite sheet |  |  |  |
| Abrasion resistance (times) | 235 | 256 | 110 |
| Moisture permeability (mg/cm² · hr) | 2.1 | 3.2 | 0.35 |
| Leather-likeness index | 57 | 63 | 50 |

Ex. = Example, C.Ex. = Comparative Example

TABLE 3

| Example No. | 7 | 8 | 9 | 10 | 11 | 12 | 13 |
|---|---|---|---|---|---|---|---|
| Porous sheet No. | 1 | 2 | 3 | 4 | 5 | 6 | 1 |
| Abrasion resistance (times) | 235 | 346 | 193 | 215 | 258 | 295 | 256 |
| Moisture permeability (mg/cm² · hr) | 2.1 | 1.6 | 2.5 | 2.9 | 1.8 | 1.2 | 3.2 |
| Flexural hardness (mN/cm) | 0.7 | 0.9 | 0.8 | 0.7 | 0.7 | 0.9 | 0.3 |
| Compressive stress (mN/cm) | 40 | 51 | 40 | 45 | 38 | 39 | 19 |
| Leather-likeness index | 57 | 57 | 50 | 64 | 54 | 43 | 63 |
| Flexing fatigue (grade) | 3 | 3 | 3 | 3 | 3 | 2 | 3 |
| Feeling of fine wrinkles | ++ | ++ | ++ | ++ | ++ | ++ | ++ |

What is claimed is:

1. A porous sheet formed of first elastic polymer, the sheet having a thickness of 10 to 50 μm and having 500 to 15,000 fine pores per mm² inside, the fine pores having an average pore diameter of 1 to 20 μm, the porous sheet having a breaking strength of 1 to 15 N/mm² and a breaking elongation of 100 to 500%.

2. The porous sheet of claim 1, wherein said first elastic polymer is a water-dispersible elastic polymer.

3. The porous sheet of claim 1, which has one surface (surface A) having 50 to 5,000 opening portions per mm², the opening portions having an average diameter of 1 to 20 μm.

4. The porous sheet of claim 1, which has a density of 0.5 to 0.9 g/cm³.

5. The porous sheet of claim 1, wherein, when the porous sheet is divided into three layers in parallel with the surface of the porous sheet such that the thickness is divided, the value of maximum value/minimum value of averages of diameters of the pores of the layers is 1.5 or less.

6. The porous sheet of claim 1, whose organic solvent content is 0.05% by weight or less.

7. The porous sheet of claim 1, whose weight loss in N,N-dimethylformamide is 25% by weight or less.

8. The porous sheet of claim 1, where in the first elastic polymer is a polyurethane resin.

9. A process for the production of a porous sheet, which comprises preparing a stable first aqueous dispersion containing a first elastic polymer and water-repellent particles, pre-heating the first aqueous dispersion at a temperature of 60 to 90° C. under a condition of volatizing water where the first aqueous dispersion has a water content of 20 to 80 wt %, and then removing water that remains after the preheating.

10. The process of claim 9, wherein the first elastic polymer is a self-emulsifiable elastic polymer.

11. The process of claim 9, wherein the first aqueous dispersion is an aqueous dispersion obtained by mixing a dispersion of the first elastic polymer in water with an aqueous dispersion of water-repellent particles having a cloud point of 50 to 90° C.

12. The process of claim 9, wherein said pre-heating is carried out at a temperature that is higher than a cloud point of an aqueous dispersion of the water-repellent particles but is not higher than 90° C.

13. The process of claim 9, wherein the weight of the water-repellent particles based on the weight of the elastic polymer in said first aqueous dispersion is 3 to 70% by weight.

14. The process of claim 9, wherein said water-repellent particles are formed of a silicon compound.

15. The process of claim 9, which comprises applying said first aqueous dispersion onto a release paper, pre-heating an applied aqueous dispersion and then removing water.

16. A fiber composite sheet comprising a substrate made of a fiber aggregate as a main component and the porous sheet of claim 1 laminated on a surface of the substrate.

17. The fiber composite sheet of claim 16, which has an adhesive layer formed of an second elastic polymer between said substrate and the porous sheet.

18. The fiber composite sheet of claim 16, which has an abrasion resistance of at least 120 times on a surface on the porous sheet side.

19. The fiber composite sheet of claim 16, wherein fibers of the fiber aggregate constituting said substrate are very fine fibers having a monofilament size of 0.01 to 1.0 dtex.

20. The fiber composite sheet of claim 16, wherein said substrate has a third elastic polymer in gaps among fibers thereof and the substrate has a density of 0.2 to 6.0 $g/cm^2 \cdot hr$.

21. The fiber composite sheet of claim 16, which has a moisture permeability of 1 to 10 $mg/cm^2 \cdot hr$.

22. A process for the production of a fiber composite sheet, which comprises laminating the porous sheet of claim 1 on the surface of a substrate made of a fiber aggregate as a main component to form a laminate, heating the laminate at a temperature of 100 to 150° C. for 3 seconds to 5 minutes and then nip-treating the laminate with a hot roll at 100 to 150° C.

23. The process of claim 22, wherein said laminate has an adhesive layer formed by applying an aqueous dispersion of a second elastic polymer on the surface of a substrate made of a fiber aggregate as a main component or on the surface of a porous sheet to form a laminate.

24. A process for the production of a fiber composite sheet, which comprises laminating a substrate made of a fiber aggregate as a main component on the porous sheet of claim 1 formed on the surface of a release paper to form a laminate, heating the laminate at a temperature of 100 to 150° C. for 3 seconds to 5 minutes, then nip-treating the laminate with a hot roll at 100 to 150° C., aging the laminate at a temperature of 50 to 70° C. for 16 to 48 hours and then peeling the release paper off.

25. The process of claim 24, wherein said laminate has an adhesive layer formed by applying an aqueous dispersion of a second elastic polymer on the surface of the porous sheet or on the surface of a substrate made of a fiber aggregate as a main component to form a laminate.

26. An artificial leather made of the fiber composite sheet of claim 16.

* * * * *